Patented May 20, 1924.

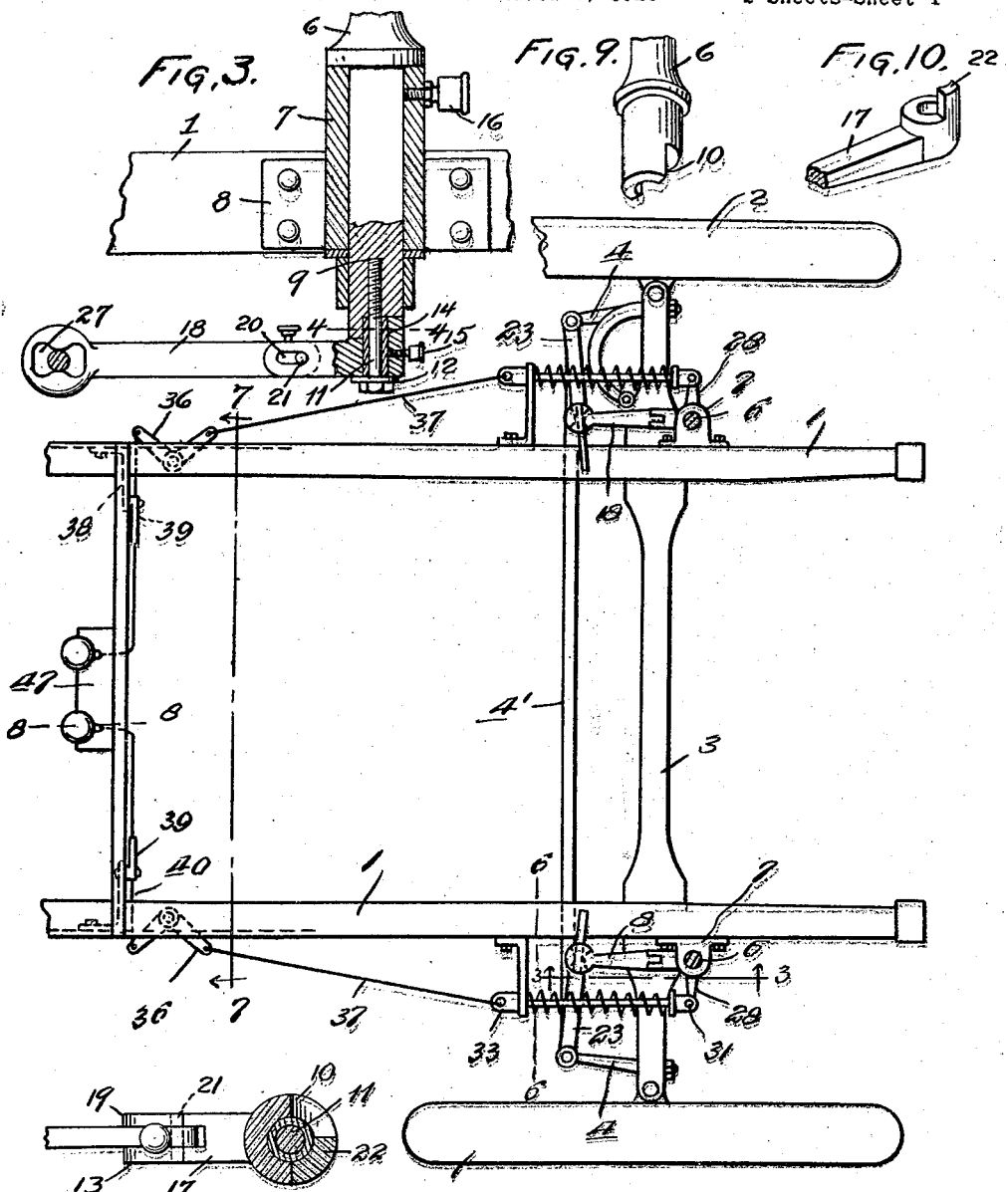

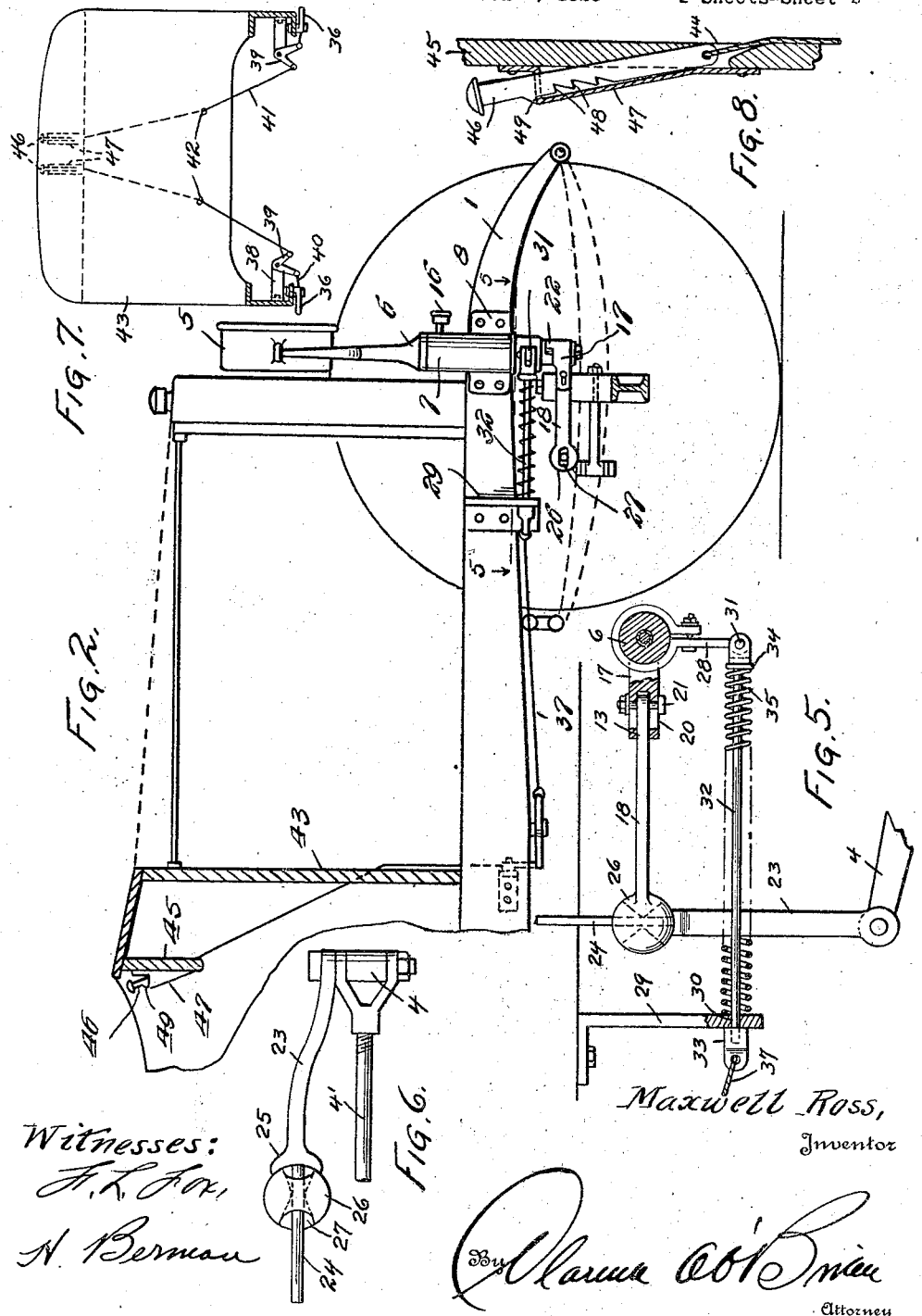

1,494,711

UNITED STATES PATENT OFFICE.

MAXWELL ROSS, OF HOUSTON, TEXAS.

DIRIGIBLE-HEADLIGHT CONSTRUCTION FOR AUTOMOBILES.

Application filed March 3, 1923. Serial No. 622,489.

*To all whom it may concern:*

Be it known that I, MAXWELL ROSS, a citizen of the United States, residing at Houston, in the county of Harris and State of Texas, have invented certain new and useful Improvements in Dirigible-Headlight Constructions for Automobiles, of which the following is a specification.

The primary object of my present invention is to substantially improve upon the dirigible headlight construction shown and described in Patent No. 1,434,503, granted to me on the 7th day of November 1922.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is a plan view showing a portion of an automobile equipped with my improvement.

Figure 2 is a longitudinal vertical sectional view of the same.

Figure 3 is a detail vertical section on the line 3—3 of Figure 1.

Figure 4 is a transverse sectional view upon the line 4—4 of Figure 3.

Figure 5 is an enlarged detail transverse section on the line 5—5 of Figure 2.

Figure 6 is a fragmentary detail section upon the line 6—6 of Figure 1.

Figure 7 is a detail transverse section on the line 7—7 of Figure 1.

Figure 8 is a detail vertical section on the line 8—8 of the same figure.

Figure 9 is a detail perspective showing the lower portion of one of the lower posts, and Figure 10 is a detail perspective of one of the swinging arms through the medium of which the said posts are turned.

As in my patented device the chassis 1, the front wheels 2, axle 3 and the steering mechanism including swinging knuckles 4 and connecting rod 4' may be and preferably are of the well known types.

At 5 are lamps or headlights, and at 6 are posts by which the lamps are carried, the said posts being mounted to turn about their axes within bearing collars 7 formed upon brackets 8 carried by the chassis 1 and being provided with threaded bores 9 and side recesses 10, the latter at the lower ends as best shown in Figures 4 and 9.

Headed and threaded bolts 11 are secured in the bores 8 of the posts 6 and supported by washers 12 on the heads of said bolts 11 are swinging arms 13 through the medium of which the posts 6 are turned about their axes by operation of the steering mechanism. Bearing sleeves 14 surround the lower ends of the bolts 11 for overcoming friction between these bolts and the arms 13, a lubricant being fed to these sleeves by grease cups 15. Grease cups 16 are also provided upon the said sleeves or collars 7 for supplying a lubricant to the posts 6.

Each of the arms 13 comprise sections 17 and 18, the section 17 being bifurcated at one end as at 19, the legs formed thereby being slotted at 20. The adjacent ends of the arm sections 18 extend within the bifurcated ends of the sections 17 and carry cross pins 21 for engagement within the slots 20 for thereby providing a sliding and pivotal connection between the arm sections 17 and 18 for purposes hereinafter described. The inner ends of the arm sections 17 are provided with upwardly extending projections 22, disposed in the recesses 10 of the posts 6 and of less size in horizontal section than said recesses 10. I would also have it understood that the joint between the post 6 and arm 13 at one side of the car is reversely arranged to the joint between the post 6 and arm 13 at the opposite side of the car so that when the steering mechanism is actuated to turn the car toward the right the right hand lamp 5 will alone be turned to the right, the left hand lamp 5 remaining straight ahead position to illuminate in that direction, while when the steering mechanism is actuated to turn the car toward the left, the right hand lamp 5 will remain in straight ahead position, and the left hand lamp alone will be turned toward the left.

In view of the recesses 10 being larger than the projections 22 the posts 6 are capable of turning movement within certain limitations independently of the arm 13.

Upon the ends of the steering knuckles 4 and above the connections between these knuckles and the steering rod 4' are inwardly extending arms 23 formed with projecting rods 24 as well as curved shoulders 25 at the inner ends of these rods, which construction is more clearly shown in Figures 5 and 6. The free ends of the sections 18 of the arms 13 are formed with heads 26 of ball shape through which are transverse openings 27, the opposite ends thereof being flared outwardly as shown, and are adapted for receiving the rods 24 of the arms 23, the shoulders 25 of these rods having normally close contact with said heads and the formation of the slots in the heads permitting of a swinging movement of the rods therein.

Clamped or otherwise appropriately fixed to the lower portions of the posts 6 are arms 28, Figures 1 and 5, and fixed to the chassis 1 and located in the rear of said arms 28 are guide brackets 29 apertured at 30. Pivotally connected at 31 to the arms 28 and extending rearwardly to the apertures 30 of the guide brackets 29 are rods 32 with apertured heads 33 in rear of and normally bearing against the brackets 29. Surrounding the rods 32 and interposed between abutments 34 thereon and the brackets 29 are coil springs 35 which serve to yieldingly maintain the lamps 5 in and return the same to straight ahead positions.

Mounted on the chassis 1 are horizontal bell cranks 36, Figures 1, 2 and 7, the forward arms of which are connected by rods 37 with the rods 32, and mounted on brackets 38 carried by the chassis 1 are vertical bell cranks 39. The outer arms of the bell cranks 39 are connected through rods 40 with the rear arms of the cranks 39. At 41 are cables connected to the inner arms of the bell cranks 39. These cables are extended through apertures 42 in the vehicle dash board 43 and are further extended through apertures 44 in the instrument board 45 and are connected to the lower ends of handle bars 46, Figures 1, 2, 7 and 8. These bars 46 are arranged and movable in housings 47 on the rear side of the board 45 and are toothed at 48 to engage the top walls 49 of the housings 47 so that either of the lamps 5 may be adjustably fixed in the position to which it is moved.

As the steering knuckles 4 are turned the posts 6 are rotated in the bearing collars 7 by the arms 23 and the brackets 8. The posts 6 are returned to normal position under the influence of the springs mounted upon the rods 32 and which rods are pivotally connected with the arms 28 fixed upon the posts 6.

Having described my invention, what I claim and desire to secure by Letters-Patent, is:—

In an automobile, the combination of a chassis, a horizontal bracket carried by the chassis and having a vertical bearing sleeve or collar arranged thereon, a post journaled in said sleeve or collar and having a portion bearing thereon and also having a central threaded socket and a recess in its lower end, a lamp on said post, a threaded bolt occupying the threaded socket in the post and having a head at its lower end, a swinging arm supported on said bolt and having a projection of less size than said post recess extending upwardly into and movable in said recess, said arm comprising a pair of sections slidably and pivotally secured together, a sliding connection between said steering mechanism and one of said sections, an apertured guide bracket carried by the chassis and disposed in the rear of the post, an arm secured to the post below the first named bracket, a rod connected to said arm and extending rearwardly through the guide bracket and having an abutment in front of the same, and a spring coiled about the rod and interposed between said bracket and abutment.

In testimony whereof I affix my signature.

MAXWELL ROSS.